United States Patent [19]

Otsubo

[11] Patent Number: 4,811,002
[45] Date of Patent: Mar. 7, 1989

[54] RELATIVE POSITIONAL RELATION DETECTING SYSTEM

[75] Inventor: Kazumi Otsubo, Saitama, Japan

[73] Assignee: Honda Giken Kogyo Kabushiki Kaisha, Tokyo, Japan

[21] Appl. No.: 104,442

[22] Filed: Oct. 2, 1987

[30] Foreign Application Priority Data

Oct. 3, 1986 [JP] Japan ............................ 61-235570
Oct. 3, 1986 [JP] Japan ............................ 61-235571

[51] Int. Cl.⁴ .......................................... G08B 21/00
[52] U.S. Cl. ...................................... 340/687; 33/533; 73/865.8; 324/538; 340/540; 340/686; 250/555
[58] Field of Search ............... 340/687, 686, 540; 33/533; 324/538, 503, 501; 250/555, 206; 73/865.8

[56] References Cited

U.S. PATENT DOCUMENTS 3,611,261 10/1971 Gregory ............................ 340/687
3,898,617 8/1975 Kashioka et al. .................. 382/48
4,507,697 3/1985 Ozil et al. ........................... 340/687
4,649,369 3/1987 Walker et al. ..................... 340/686

FOREIGN PATENT DOCUMENTS 3424453 1/1985 Fed. Rep. of Germany .

Primary Examiner—Glen R. Swann, III
Attorney, Agent, or Firm—Irving M. Weiner; Joseph P. Carrier; Pamela S. Burt

[57] ABSTRACT

A relative positional relation detecting system has a detector for the recognition of and inspection by use of a predetermined identification mark provided on each of at least two members to be put in a predetermined relative position to each other. The detector comprises an irradiation device for irradiating the identification mark with rays of light, a light detection device for detecting reflected rays of light from the identification mark, and a judging device for judging whether or not the members are put in the predetermined relative position, depending on a detection signal from the light detection device.

27 Claims, 3 Drawing Sheets

RELATIVE POSITIONAL RELATION DETECTING SYSTEM

BACKGROUND OF THE INVENTION

1. Field of the Invention

The present invention relates generally to a positional detection system, and more particularly to a system for detecting the relative positional relation between at least two members to be put in a predetermined relative position to each other.

2. Description of Relevant Art

Exemplarily, electrical components of a vehicle are connected, through their external wiring having electric connectors in the routes, to electronic controls arranged on an instrument panel or the like. Such electric connectors generally consist of matched plug and receptacle. There is a recent tendency in which such plug and receptacle are coupled to mate with each other in an automatic process using a robot or the like. It thus is desirable to provide a system for checking whether or not the mating of a plug and a receptacle is proper after such an automatic process.

The present invention has been achieved to answer such a desire, exemplarily in an automatic connector mating process for vehicles.

SUMMARY OF THE INVENTION

An object of the present invention is to provide a simple system for detecting the relative positional relation between at least two members, such as a plug and a receptacle for example, to be put in a predetermined relative position to each other.

To achieve the object, the present invention provides a relative positional relation detecting system for detecting the relative positional relation between at least two members to be put in a predetermined relative position to each other, wherein the system comprises a predetermined identification mark provided on each of the members, and a device for recognizing and inspecting the identification mark. The recognizing and inspecting device comprises an irradiating means for irradiating the identification mark with rays of light, a light detecting means for detecting reflected rays of light from the identification mark, and a judging means for judging whether or not the members are put in the predetermined relative position, depending on a detection signal from the light detecting means.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
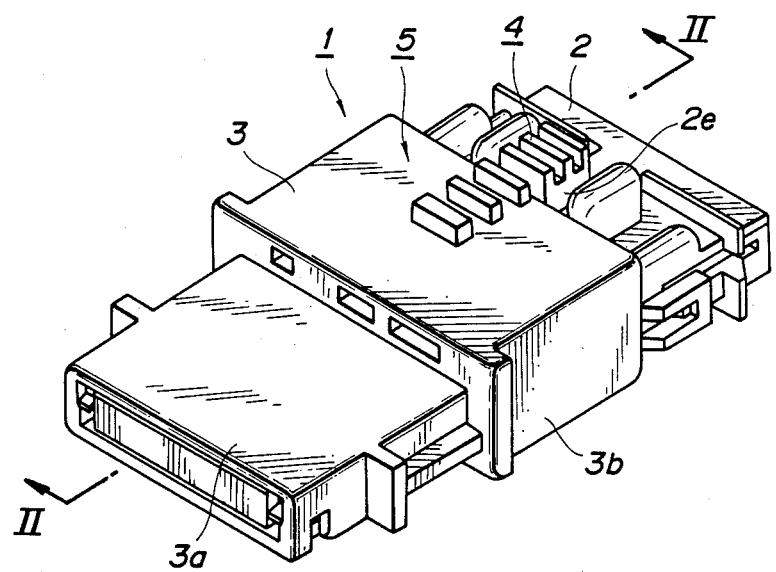
FIG. 1 a perspective view of an electric connector for vehicles consisting of a plug and a receptacle as two members of which the relative positional relation is detected by a system according to the present invention.
Figure 2:
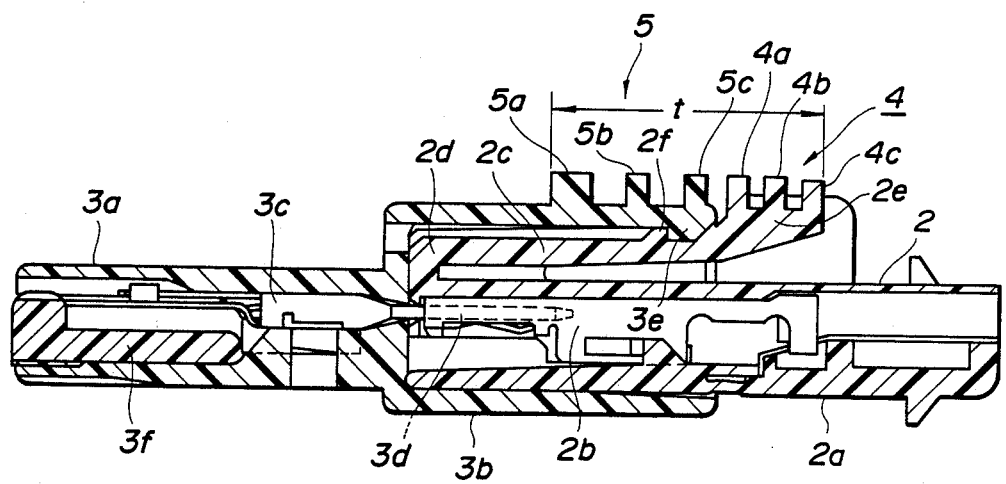
FIG. 2 is a sectional view along line II—II of FIG. 1.
Figure 3:
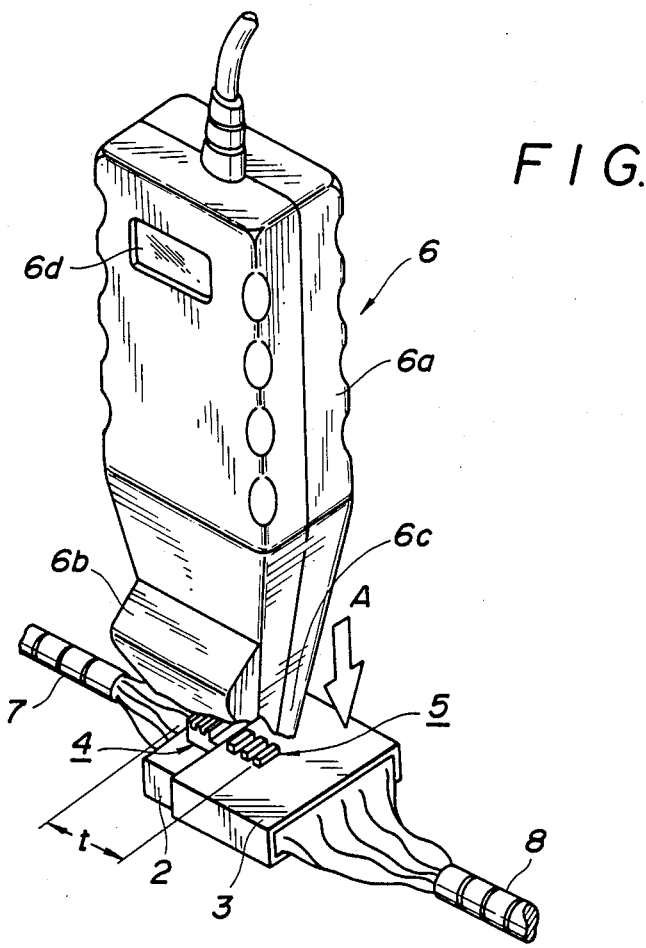
FIG. 3 is a perspective view of a mark detector in the relative positional relation detecting system.

Referring to FIGS. 1 to 3, designated at reference numeral 1 is an electric connector for vehicles consisting of matched plug 2 and receptacle 3 as two members of which the relative positional relation is detected by a system according to a preferred embodiment of the invention. The plug 2 and receptacle 3 constitute the connector 1, when coupled to mate with each other as shown in the Figures. In FIG. 1, connector 1 is diagonally viewed from ahead thereof so that the left hand and right hand of FIG. 2 correspond to the frontward and rearward directions of connector 1, respectively.

The plug 2 has an insulating housing 2a of a longitudinally long rectangular parallelepiped configuration, with female contacts 2b built therein. The contacts 2b are connected at their rear ends within housing 2a to conductors of a cable 7 extending to unshown electrical components of a vehicle. The housing 2a is formed with a protrusion 2d on the upper part thereof, which extends rearwardly from the front edge of housing 2a, forming a narrow stopper 2c. The stopper 2c has formed substantially at the longitudinally intermediate part thereof a transversely extending upward projection 2f to be engaged with a downward projection 3e formed at the rear end of receptacle 3 to thereby lock plug 2 in position with receptacle 3 in a detachable manner.

On the upper surface of a rear end part 2e of the stopper 2c there are formed three projections 4a, 4b, 4c of a predetermined rectangular parallelepiped configuration. The projections 4a, 4b, 4c extend transversely over the width of stopper 2c, respectively, and are longitudinally spaced at equal intervals. The top faces of projections 4a, 4b, 4c are polished to have a higher reflectivity to incident rays of light than other parts. Projections 4a, 4b, 4c, are cooperative to constitute a linear identification mark 4 for positional detection of plug 2. The identification mark 4 may convey information such as of the type of plug 2.

The receptacle 3 has an insulator consisting of a base portion 3a and a coupling portion 3b. The base portion 3a accommodates therein the base parts of male contacts 3c connected at the front ends to conductors of a cable 8 which in turn is connected to unshown electronic controls. The coupling portion 3b is integrally formed at the rear end of base portion 3a and fits on the front part of inserted plug 2. The downward projection 3e engaged with the upward projection 2f of plug 2 is formed inside of the upper wall of coupling portion 3b. The male contacts 3c have their rearwardly extending pin parts 3d within the portion 3b, which are plugged into the mating parts of female contacts 2b, when the plug 2 is inserted in position to be coupled with receptacle 3. The conductors of cable 8 are pressed to be held in place, with an insert piece 3f plugged into a front opening of receptacle 3.

On the upper surface of coupling portion 3b of receptacle 3 there are formed three projections 5a, 5b, 5c of predetermined rectangular parallelepiped configurations, in a longitudinally row continuous with to the projections 4a, 4b, 4c of plug 2. Middle and rear projections 5b, 5c, are equal to each other in longitudinal width, while the longitudinal width of front projection 5a is larger than that of the remaining two 5b, 5c. The projections 5a, 5b, 5c have an equal transverse width to projections 4a, 4b, 4c and are longitudinally spaced at equal intervals. The top faces of projections 5a, 5b, 5c are polished to have a higher reflectivity to incident rays of light than other parts. Projections 5a, 5b, 5c are cooperative to constitute a linear identification mark 5 for positional detection of receptacle 3. The identification mark 5 may convey information such as of the type of receptacle 3.

When the plug 2 and receptacle 3 are properly coupled with each other, the identification marks 4, 5 are aligned in the longitudinal direction, so that the respective projections 4a, 4b, 4c, 5a, 5b, 5c become parallel to each other. The elements of linear marks 4, 5 are then oriented substantially perpendicular with respect to the inserting direction of plug 2 to receptacle 3. The total longitudinal dimension t of the marks 4, 5, i.e., the distance between the front edge of front projection 5a of receptacle 3 and the rear edge of rear projection 4c of plug 2 becomes equal to a predetermined value $t_o$. The top faces of projections 4a, 4b, 4c, 5a, 5b, 5c are all vertically flush.

Figure 4:
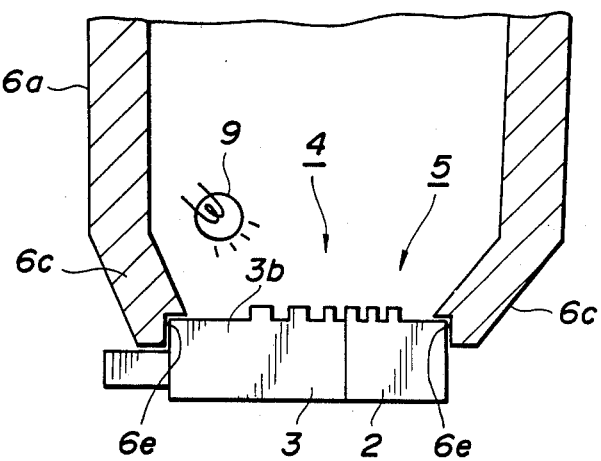
FIG. 4 is a sectional view of an essential part of the mark detector.
Figure 5:
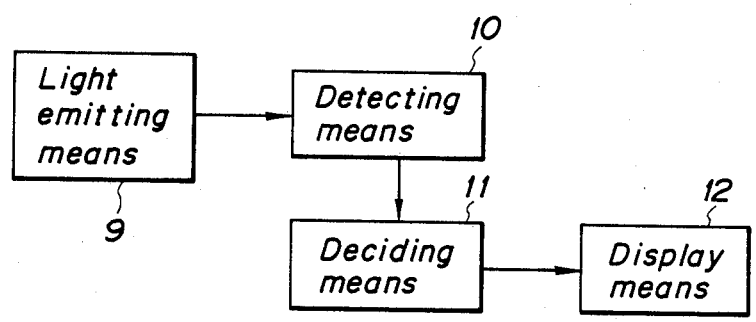
FIG. 5 is a functional block diagram of the mark detector.

FIGS. 3 to 5 are for describing a detector 6 which can recognize the linear identification marks 4, 5 to thereby check plug 2 and receptacle 3 to determine their types and mating condition.

As shown in FIGS. 4 and 5, the detector 6 includes a light source 9 having a light emitting element, such as an LED, for irradiating the marks 4, 5 with emitted rays of light, and an image pick-up device 10 which detects rays of light reflected from marks 4, 5. As the device 10 there is preferably employed an image sensor of a modern one-tip CCD (charge-coupled device) type, rather than a large-sized camera tube. The detector 6 further includes a microcomputer unit 11 (hereinafter called MCU) having necessary circuits such as an interface, I/O port, RAM and ROM. The light source 9, image sensor 10 and MCU 11 are accommodated in a casing 6a. The light source 9 is located in a bulged lower part 6b of the casing 6a, and it projects diagonal rays of light with a certain incident angle to the marks 4, 5. In the case such identification marks protrude from the surrounding surface of the connector, as in the embodiment, they can be well contrasted to the surrounding surfaces in difference of light and shade, thus permitting an increased accuracy of detection. At the bottom of casing 6a there are formed diagonally projecting left and right shielding portions 6c, 6c having cut parts 6e, 6e at the inside, respectively. As the detector 6 approaches in a normal direction A (FIG. 3) to the upper surface of connector 1, either cut part 6e fits onto the front edge of coupling portion 3b of receptacle 3, so that the distances from light source 9 to marks 4, 5 are kept constant. The projected rays of light from the source 9 are diagonal to marks 4, 5 as described, and hence the marks 4, 5 might well be detected even if none of the projections 4a, 4b, 4c, 5a, 5b, 5c were polished at the top face thereof.

The casing 6a has on either side thereof a display part 6d consisting of a liquid crystal display for example. MCU 11 receives a detection signal conveying information from image sensor 10. The conveyed information is compared with stored data in internal memories such as RAM and ROM, with the results given on display part 6d. More particularly, depending on the detection signal of image sensor 10 which informs the MCU 11 of the contrast of reflection intensity between the top faces of projections 4a, 4b, 4c, 5a, 5b, 5c and the surfaces of other parts, MCU 11 arithmetically determines the relative position and configurations of detected identification marks 4, 5, including the total longitudinal dimension t thereof, as well as the types of plug 2 and receptacle 3. The results of such computation are then compared with stored data in the memories of the MCU; exemplarily the dimension t is compared with the predetermined value $t_o$. In accordance with the results of such comparison, the display part 6d gives an appropriate sign such as by a letter or symbol. Exemplarily, the part 6d displays a letter picture of "OK", when the plug 2 and receptacle 3 are judged to be of designated types and the difference d between the dimension t and the value $t_o$ that is small enough to fall within preset error limits. To the contrary, a sign of "NG" is given, when the types of plug 2 and receptacle 3 are either or both incorrect, and when the difference d is too large to fall within the error limits even if both plug 2 and receptacle 3 are of correct types. In the case the image sensor 10 unsuccessfully detects reflected rays of light from marks 4, 5 for any reason that may exemplarily be a damage to or rupture of the marks 4, 5, there is given a picture of letters "XX" which represents the impossibility of complete detection.

FIG. 5 is a functional block diagram of the detector 6.

Incidentally, for the detection of marks 4, 5, the detector 6 may take the advantage of conventional skills such as the technique of pattern recognition or patterned positioning detection system disclosed exemplarily in U.S. Pat. No. 3,898,617 by Kashioka et al, patented Aug. 5, 1975, although the present embodiment employs the image sensor 10 of CCD type in place of a taught camera tube.

With any of the three signs "OK", "NG" and "XX" given, it exemplarily is permitted for a worker in a vehicle production line to instantaneously confirm the types of plug 2 and receptacle 3 and a proper mating condition thereof, as well as to check identification marks 4, 5 for damage or rupture. It thus is possible to take adequate and prompt countermeasures, as necessary.

According to the embodiment of the invention, there is provided a system that permits a facilitated inspection as to whether or not the plug 2 and receptacle 3 are properly coupled to mate with each other in a production process in which the connector 1 for vehicles is used. In other words, there is provided a system which simply detects the relative positional relation between plug 2 and receptacle 3 as two members to be put in a predetermined relative position to each other.

In the above embodiment there are taken plug 2 and receptacle 3 as at least two members to be put in a predetermined relative position to each other, and projections 4a, 4b, 4c and 5a, 5b, 5c are employed to constitute the identification marks 4, 5. The present invention however is not limited to the embodiment.

The present invention may be used in any situation when it is desired to determine the types of and/or the relative positional relationship between at least two arbitrary elements. Identification marks of such members also may be modified in various manners as exemplified below.

FIGS. 6 to 9 describe four modified examples of member identification marks; the respective Figures are sectional side views of essential parts of mating members on which corresponding marks are provided.

Figure 6:
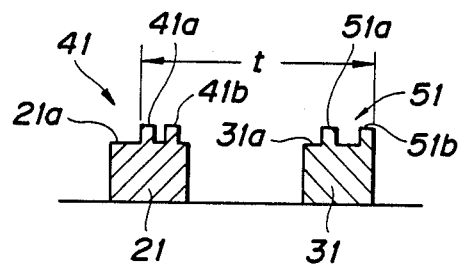
FIGS. 6 to 9 show various modified examples of identification marks to be provided on the two members.

FIG. 6 shows a first modification of identification marks. As at least two members to be put in a predetermined relative position to each other, there are taken arbitrary ones 21, 31. The members 21, 31 have formed on upper surfaces 21a, 31a thereof couples of linear projections 41a, 41b and 51a, 51b of which the top faces are polished, respectively. The distance between projections 41a, 41b of one member 21 is smaller than that between projections 51a, 51b of the other member 31. When the members 21, 31 are put in the predetermined relative position to each other, the polished top faces of all projections 41a, 41b, 51a, 51b reside in a single imaginary plane and the outermost projections 41a, 51b have a total longitudinal dimension t established as predetermined to be $t_1$ between outer surfaces thereof. The couples of projections 41a, 41b and 51a 51b constitute identification marks 41 and 51 of members 21 and 31, respectively. In the first modification, therefore, the marks 41, 51 are formed on the surfaces 21a, 31a of members 21, 31. The identification marks 41, 51 may well be utilized to confirm the relative positional relation and types of members 21, 31, and to check the marks 41, 51 themselves for damage or rupture.

Figure 7:
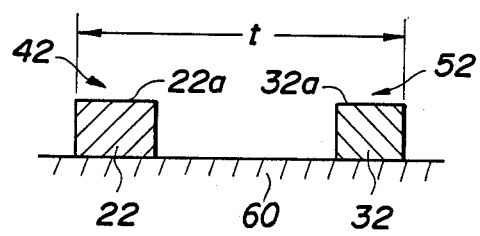

In FIG. 7 there is shown a second modification of identification marks. Designated by 22, 32 are arbitrary members placed on a background part 60, as at least two to be put in a predetermined relative position to each other. The members 22, 32 are polished over top surfaces 22a, 32a of their own, which constitute identification marks 42, 52 of members 22, 32, respectively. When the members 22, 32 are put in the predetermined relative position, the polished top surfaces 22a, 32a both reside in a single imaginary plane and have a total longitudinal dimension t established as predetermined to be $t_2$ between the front edge of surface 22a and the rear edge of surface 32a. In the second modification, therefore, the marks 42, 52 comprise the own top surfaces 22a, 32a of members 22, 32. The identification marks 42, 52 also may well be utilized to confirm the relative positional relation and types of members 22, 32, and to check the marks 42, 52 themselves for damage. The top surfaces 22a, 32a of members 22, 32 are both raised in level with respect to the surface of background part 60, which implies the possibility of their functioning as identification marks even if they were not polished.

Figure 8:
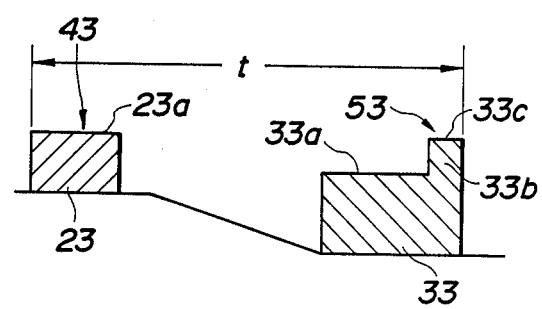

Shown in FIG. 8 is a third modification of identification marks. There also are employed arbitrary members 23, 33 as at least two to be put in a predetermined relative position to each other. One member 23 is polished over its own top surface 23a to constitute an identification mark 43 of the member 23. The other member 33 has formed on its upper surface 33a, at the rear end thereof, a single projection 33b with a polished top face 33c. The polished top face 33c constitutes an identification mark 53 of member 33. When the members 23, 33 are put in the predetermined relative position, the polished top surface 23a and the polished top face 33c both reside in a single imaginary plane and have a total longitudinal dimension t established as predetermined to be $t_3$ between the front edge of top surface 23a and the rear edge of top face 33c. It is possible to utilize the identification marks 43, 53 to confirm the relative positional relation and types of members 22, 33, as well as to check the marks 43, 53 themselves for damage.

Figure 9:
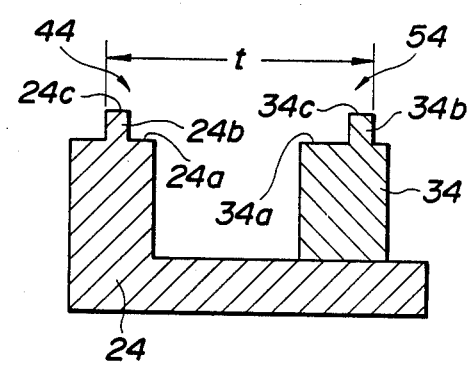

A fourth modification of identification marks is shown in FIG. 9. 24 and 34 are arbitrary members taken as at least two to be put in a predetermined relative position to each other, while one member 34 is installed on a base part of the other member 24. The member 24 has formed on its top surface 24a, at the longitudinally central part thereof, a projection 24b with a polished top face 24c. The member 34 is formed with a projection 34b on its top surface 34a, at a rearwardly offset part thereof. The projection 34b also has a polished top face 34c. The polished top faces 24c, 34c constitute identification marks of the members 44, 54, respectively. When the members 24, 34 are put in the predetermined relative position, i.e., when the member 34 is set on the member 24, the top faces 24c, 34c both reside in a single imaginary plane and have a total longitudinal dimension t established as predetermined to be $t_4$ between the front edge of face 24g and the rear edge of face 34c. Also the identification marks 44, 54 may be utilized to confirm the relative positional relation and types of members 24, 34, and to check the marks 44, 54 themselves for damage.

In the foregoing embodiment and modifications, the identification marks 4, 5; 41, 51; 53; and 44, 54 shown in FIGS. 2, 6, 8 and 9 are, constituted by use of a projection formed on the upper surface of a member to be identified, i.e., taking the advantage of a protruding-depressed relation that is well defined of contrast. It however is possible, when at least two members are to be put in a predetermined relative position to each other, to employ a set of identification marks of any type, if the marks substantially reside in a single imaginary plane when the identified members are put in the predetermined relative position, and moreover if the marks are distinctive to the surrounding in respect of light reflectivity or if they have a different level to a certain background part. Exemplarily, such members may be identified by polishing partial areas of their surfaces so that the polished areas become distinctive to the rest in light reflectivity. In some cases, identification marks may comprise a variety of seals to be affixed on particular areas to thereby render the reflectivity distinctive to the surrounding. It will be understood that for positional detection of members of some type the identification of the respective members may be sufficiently achieved by using the members themselves as marks therefor, without polishing their top surfaces, if the top surfaces are coplanar thereamong and located at a higher level than the surface of a background part, as exemplified in the second modification shown by FIG. 7.

Although there has been described what is at present considered to be the preferred embodiment of the invention, it will be understood that the present invention may be embodied in other specific forms without departing from the spirit or essential characteristics thereof. The present invention is therefore to be considered in all respects as illustrative but not restrictive. The scope of the invention is indicated by the appended claims rather than by the foregoing description.

We claim:

1. A relative positional relation detecting system for detecting the relative positional relation between at least two members to be put in a predetermined relative position to each other, wherein
said system comprises:
a predetermined identification mark provided on each of said at least two members; and
a device for recognizing and inspecting said identification mark; and
said recognizing and inspecting device comprises an irradiating means for irradiating said identification mark with rays of light, a light detecting means for detecting reflected rays of light from said identification mark, and a judging means for judging whether or not said at least two members are put in said predetermined relative position, depending on a detection signal from said light detecting means.

2. A relative positional relation detecting system according to claim 1, wherein;
said identification mark comprises a projection formed on at least one of said at least two members.

3. A relative positional relation detecting system according to claim 1, wherein;
said identification mark comprises a partial surface of said at least two members.

4. A relative positional relation detecting system according to claim 1, wherein;
said identification mark comprises a reflective surface formed on a part of each of said at least two members so as to have a distinctive light reflectivity to the surrounding surface.

5. A relative positional relation detecting system according to claim 4, wherein;
said reflective surfaces of said at least two members are substantially flush with each other under the condition that said at least two members are put in said predetermined relative position.

6. A relative positional relation detecting system according to claim 1, wherein:
said at least two members comprise a pair of members to be fitted one into the other in said predetermined relative position;
said identification mark is linear; and
said identification mark is oriented substantially perpendicular with respect to the fitting direction of said one member to the other.

7. A relative positional relation detecting system according to claim 1, wherein;
said identification mark is linear.

8. A relative positional relation detecting system according to claim 1, wherein;
said at least two members comprise a pair of members to be fitted one into the other in said predetermined relative position.

9. A relative positional relation detecting system according to claim 1, wherein;
said judging means has for a decision thereof a criterion on the distance between predetermined parts of said identification marks of said at least two members.

10. A relative positional relation detecting system according to claim 1, wherein;
said judging means has for a decision thereof a criterion on the contrast between said identification marks of said at least two members and other parts thereof.

11. A relative positional relation detecting system according to claim 1, wherein;
said recognizing and inspecting device further comprises a display means for displaying a sign in accordance with the results of judgment of said judging means.

12. A relative positional relation detecting system according to claim 1, wherein:
said at least two members comprise a plug and a receptacle to be coupled to mate with each other to constitute a connector for electrical components of a vehicle.

13. A set of members to be arranged in a predetermined positional relation, comprising:
at least two members each respectively provided with a predetermined mark for reflecting projected rays of light and for a judging means to inspect whether or not said at least two members are arranged in said predetermined positional relation, by detecting the reflected rays of light.

14. A set of members according to claim 13, wherein said mark comprises a protruding part and a depressed part.

15. A set of members according to claim 14, wherein:
said marks have reflective surfaces with a different reflectivity to light than that of other portions of the members.

16. A set of members according to claim 15, wherein:
said at least two members are coupled to mate with each other.

17. A set of members according to claim 16, wherein:
said mark have a linear configuration.

18. A set of members according claim 16, wherein:
said mark is linear in configuration and oriented substantially perpendicular to a direction in which said at least two members are coupled to mate with each other.

19. A set of members according to claim 18, wherein:
said marks are formed on flush, adjacent surfaces of said at least two members.

20. A set of members according to claim 16, wherein:
said marks are formed on flush, adjacent surfaces of said at least two members.

21. A set of members according to claim 20, wherein:
said at least two members are a plug and receptacle for connecting a unit such as an electrical component and an electronic control.

22. A set of members according to claim 13, wherein:
said marks have reflective surfaces with a different reflectivity to light than that of other portions of the members.

23. A set of members according to claim 13, wherein:
said at least two members are coupled to mate with each other.

24. A set of members according to claim 13, wherein:
said marks have a linear configuration.

25. A set of members according to claim 13, wherein:
said at least two members are a plug and a receptacle for connecting a unit such as an electrical components and an electronic control.

26. A relative positional relation detecting system for detecting the relative positional relation between at least two members to be put in a predetermined relative position to each other, comprising:
a base on which said at least two members are arranged;
identification marks each respectively consisting of upper surfaces of said at least two members as arranged on said base;
said upper surfaces of said at least two members residing in a single imaginary plane;
said upper surfaces of said at least two members being different from said base in level;
a device for recognizing and inspecting said identification marks; and
said recognizing and inspecting device consisting of an irradiating means for irradiating said identification marks with rays of light, a light detecting means for detecting reflected rays of light from said identification marks, and a judging means for judging whether or not said at least two members are put in said predetermined relative position, depending on a detection signal from said light detecting means.

27. A relative positional relation detecting system according to claim 26, wherein:
said identification marks comprise protruding or depressed parts each respectively formed on said at least two members.

* * * * *

UNITED STATES PATENT AND TRADEMARK OFFICE
CERTIFICATE OF CORRECTION

PATENT NO. : 4,811,002

DATED : March 7, 1989

INVENTOR(S) : Kazumi OTSUBO

It is certified that error appears in the above-identified patent and that said Letters Patent is hereby corrected as shown below:

```
Column 2, line 64, change "longitudinally" to --longitudinal--.
Column 3, line 43, change "surface" to --surfaces--.
Column 4, line 57, change "when" to --where--.
Column 6, line 7, delete "25";
          line 11, change "24g" to --24c--;
          line 12, change "34c," to --34c.--.
Column 8, line 13 (Claim 17, line 2), change "mark" to --marks--;
          line 14 (claim 18, line 1), after "according" add --to--.
```

Signed and Sealed this

Twelfth Day of December, 1989

*Attest:*

JEFFREY M. SAMUELS

*Attesting Officer*     *Acting Commissioner of Patents and Trademarks*